April 26, 1966 R. A. REYNOLDS 3,248,629
MOTOR CONTROL SYSTEM AND TORQUE INDICATING MEANS
Filed March 14, 1960 2 Sheets-Sheet 1
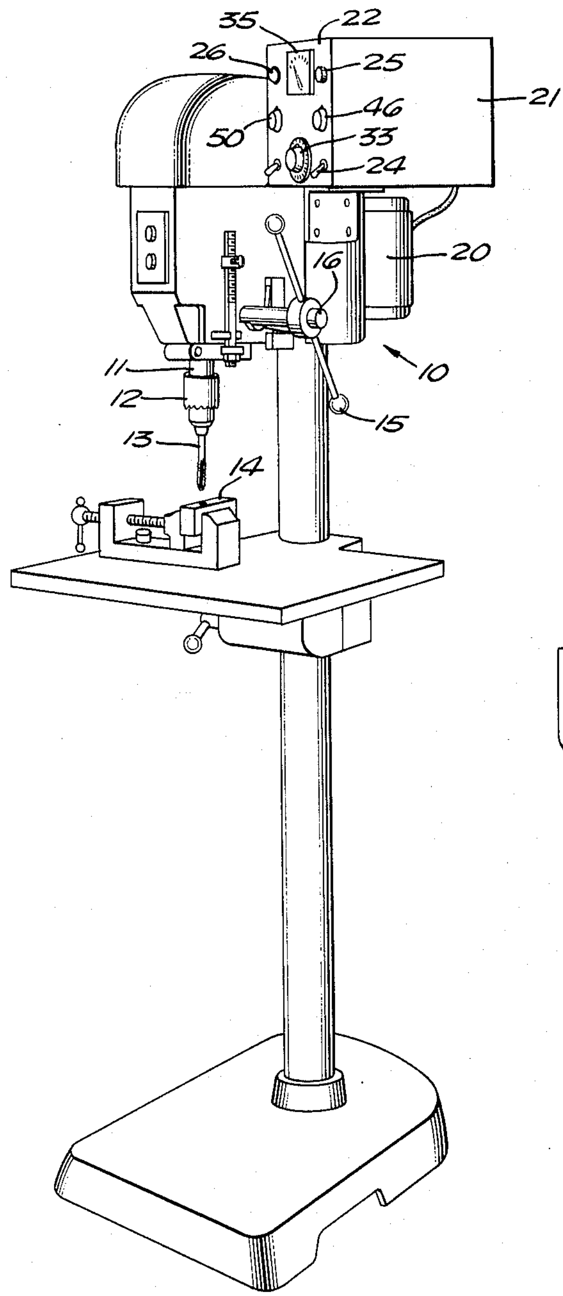
FIG. 1.
FIG. 2.
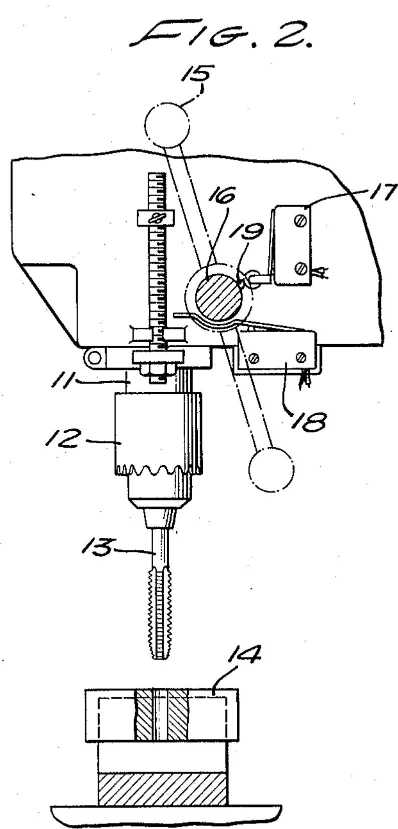
INVENTOR.
ROLLIN A. REYNOLDS
BY
Paul A. Weilein
ATTORNEY

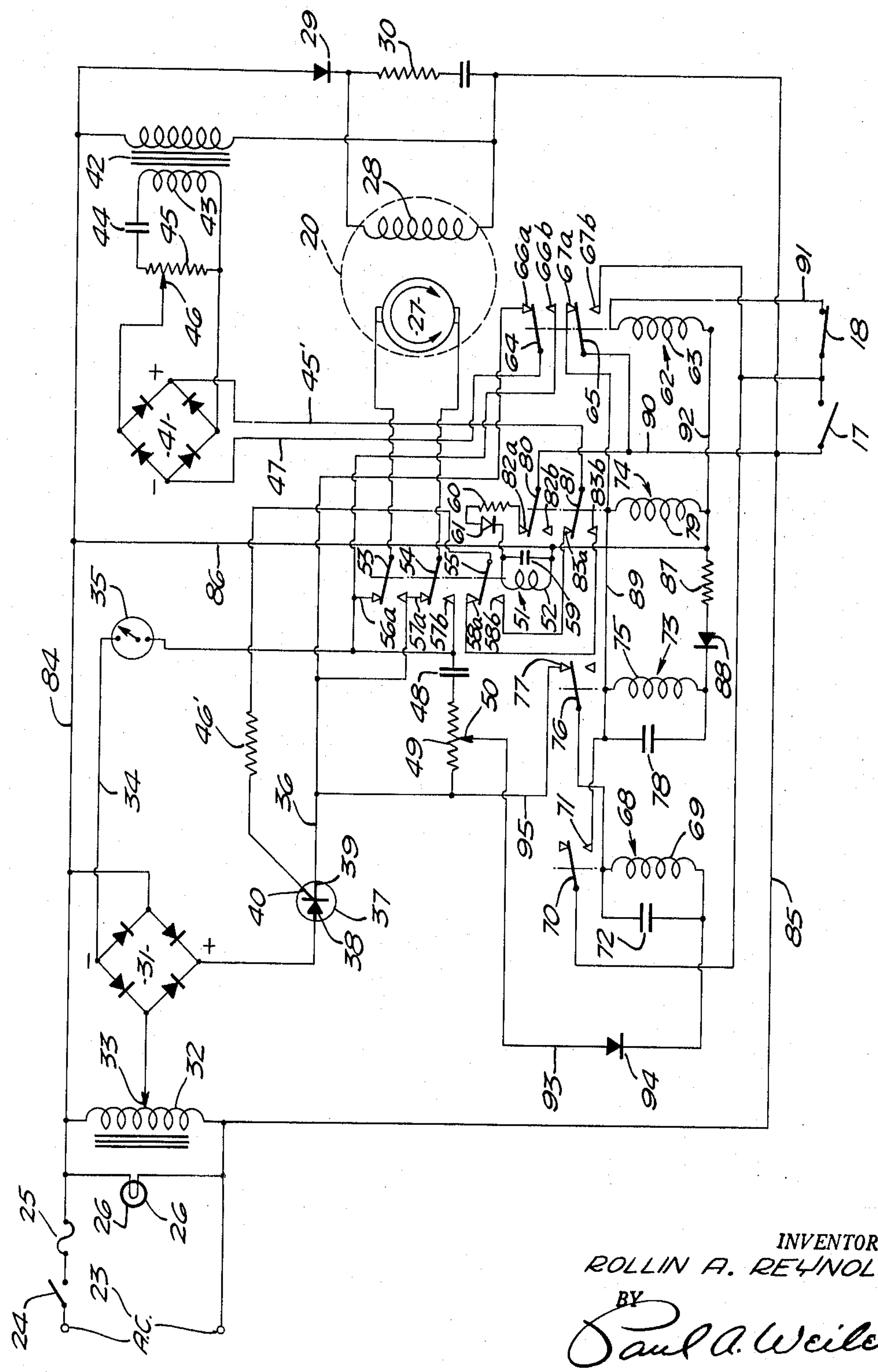
INVENTOR.
ROLLIN A. REYNOLDS
BY Paul A. Weilein
ATTORNEY

United States Patent Office 3,248,629
Patented Apr. 26, 1966

3,248,629

MOTOR CONTROL SYSTEM AND TORQUE INDICATING MEANS

Rollin A. Reynolds, Palos Verdes, Calif., assignor to Dyna Systems Inc., Torrance, Calif., a corporation of California

Filed Mar. 14, 1960, Ser. No. 14,615
16 Claims. (Cl. 318—257)

The present invention relates generally to a system for controlling an electric motor, and is more particularly concerned with control means for automatically pulsing a direct current motor in accordance with variations in load-torque conditions.

For purposes of illustration the control system will be explained with particular reference to a direct current motor for driving a thread tapping machine, although in its broad concept, the control system may be utilized with motors for other applications wherein similar operating problems occur.

The present invention is especially adapted for thread tapping machines for tough or difficult to machine materials such as heat resistant alloys, titanium, hardened steels and the like. In the case of such materials tap breakage has heretofore been prohibitive, or where the machines are not of an automatic character require substantially constant attention and skill on the part of the operator in order to tap materials of this character without excessive tap breakage.

In its broad concept, the present invention briefly provides a control system wherein the motor torque may be adjustably controlled and maintained at a value somewhat less than the breaking strength of the tap, and wherein the proper operating speed may be readily adjusted and controlled at any time. The control is so arranged as to energize the direct current driving motor in successive pulses. Provision is further made through a unique cycling control which is sensitive to load-torque characteristics of the motor and will operate to reverse the direction of rotation of the motor whenever the present torque occurs, and then after a time interval switches the motor for forward operation.

High torque conditions may occur due to the tap hitting a chip or for other reasons. By means of these successive oscillations, it is possible to utilize the inertia of a motor armature and spindle to do a large portion of the work. The hammering effect thus breaks the chip and advances the work until the tap again strikes a hard spot where high torque will result, whereupon the cycle repeats itself. By utilizing a properly designed R-C circuit, it is possible to control the time interval of reversals in accordance with the torque characteristics, that is, a small chip will produce a low torque and give short reversing action, whereas a large chip will produce a longer reversing cycle. Once the machine has completed the tapping job, the control is so arranged that the tap will be withdrawn at a high speed, and upon resuming the next tapping operation will operate at the required set speed.

The invention further contemplates torque measuring and indicating means for giving a continuous indication of the torque-load conditions of operation of the motor and provides means for adjusting the torque so as to vary the torque and/or maintain the torque substantially constant as desired. Such an arrangement finds use as a testing device for determining, for example, the torque at which a member subjected to torque forces will fail. As a futher example, the motor may be utilized to drive a coil winding mandrel, and by the present invention, the load-torque forces will be indicated, and by manipulation of the controls may be adjusted so as to retain the wire tension within safe limits and substantially constant during the winding operation.

It is one object of the present invention to provide a motor control system for a direct current motor, wherein the motor will be energized in successive energizing pulses, in accordance with an operating characteristic of the motor.

A further object is to provide a control system for a direct current motor having means for adjustably regulating the speed range and the motor torque.

Another object is to provide a unique cycling control for a direct current motor wherein the motor will be oscillated in reverse and forward directions whenever a preset torque is reached.

Still another object is to provide in a cycling control of the foregoing character, means which are operative to provide reverse direction operation which varies in length depending upon the size of chip encountered in the tapping operation. That is, a small chip will reverse the motor for a short interval of time, whereas a large chip will reverse the motor for a longer period of time, thus permitting full advantage to be taken of the inertia of the armature and other moving parts.

Yet another object is to provide unique motor torque-load indicating means, and control whereby the torque may be adjustably varied and/or maintained at a substantially constant value in accordance with required operating characteristics.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a perspective view of a conventional drill press to which the present invention has been applied to convert it to a tapping machine;

FIG. 2 is an enlarged fragmentary elevational view, partly in section, and showing the manner in which control limit switches are utilized for controlling the traverse movement or depth of cut required; and FIG. 3 is a schematic wiring diagram of the control system embodying the features of the present invention.

Referring more specifically to the drawings, the control system for illustrative purposes has been shown and will be described in connection with a tap threading machine of conventional construction, as generally indicated at 10 in FIG. 1. The tap threading machine embodies the usual spindle 11 fitted with a chuck 12 in which the tapping tool 13 is secured. The tap is arranged to be advanced toward and retracted from a work piece 14 by means of conventional mechanism including a hand lever 15, in this case shown as being carried upon an actuating shaft 16. The transverse movement or depth of cut of the tapping tool 13 may be regulated by limit switches, illustrated in FIG. 2 as including a normally open upper limit switch 17, and a normally closed lower limit switch 18, which are arranged to be actuated by a camming projection 19 or other means associated with the shaft 16.

The spindle 11 is driven from a main driving motor 20 through a belt transmission or other conventional means (not shown), and the motor operation is controlled by the control system of the present invention, the components of the control system being housed within a control housing or casing 21 having a forward control panel 22. The essential components which must be manually varied and preset, as well as indicating instruments and devices are mounted on the panel 22 within convenient reach and observation by the operator or attendant.

The control system of the present invention will now be described in detail, reference being had to the wiring diagram showing the circuitry, as illustrated in FIG. 3. The main supply source for the motor is from a conventional A.C. circuit 23 which may contain a conventional main line switch 24, and protective fuse 25. Moreover, an indicating lamp 26 may be provided for showing when the control system of the present invention is energized.

The main driving motor 20 is of the direct current type and is shown as having a separately energized armature 27 and a field 28 which is energized with rectified A.C. line voltage through a diode 29, the field being connected across a filter 30 in circuit with the diode.

The armature 27 is energized with a pulsating direct current from the output side of a bridge rectifier 31 having its input connected to an autotransformer 32 through an adjustable or slide contact 33 which permits the output of the rectifier to be adjusted for control of the motor torque. The negative terminal of the rectifier 31 is connectable through a circuit conductor 34 with one side of the armature, this conductor containing a torque meter 35 therein, which gives an indication of torque and permits use of the invention for torque testing purposes. The positive side of the rectifier 31 is connected to the other side of the armature by a circuit containing a conductor 36. This circuit contains an electronic switching device 37 such as commercially referred to as a silicon controlled rectifier. This device has an anode electrode 38 which is connected to the positive output side of the rectifier 31, and a cathode electrode 39 which connects with the armature 27. The device also has a control or gate electrode 40 by means of which current flow between the electrodes 38 and 39 may be gate controlled.

A second direct current pulsating source of potential is obtained from the output side of a bridge rectifier 41 having its input supplied from a transformer 42 containing a secondary winding 43 across which there is connected a capacitor 44 in circuit with a potentiometer 45 having a slide contact 46 which permits adjustment of the input voltage to the rectifier 41. The capacitor 44 serves to provide a phase angle between the pulsating direct current output of rectifier 41, with respect to the pulsating direct current output of rectifier 31, while the slide contact 46 provides for adjusting the output voltage of the rectifier 41 which is utilized for adjusting the motor speed. The positive potential output side of the rectifier 41 is connected through a circuit including conductor 45′ to the control or gate electrode 40, a current limiting resistor 46′ being included in this circuit. The negative potential side of the output from the bridge rectifier 41 is normally connected, through a circuit including a conductor 47, with the conductor 34 from the negative output side of rectifier 31.

There is also provided a capacitor 48 and a potentiometer 49 that are connected across the supply circuit to armature 27 and form an R-C network which reflects the motor torque and develops a voltage across the potentiometer which is utilized in connection with the cycling control to be hereinafter described, the amount of voltage utilized being adjustable through a slide contact 50. With this arrangement, it will be appreciated that, upon an increase of torque, the increased armature current acts to charge the capacitor 48, and as the pulsating direct current voltage decreases, the capacitor 48 discharges. When the discharged current is of sufficient amount and direction, the forward current through the device 37 will be reduced below a minimum holding current value, whereupon the device opens to cut off flow to the armature 27. As the armature slows down, its counter electromotive force decreases, and since this counter electromotive force is in opposition to the potential from the bridge rectifier 41, and which potential is displaced phasewise with reference to the pulsating direct current from rectifier 31, the potential from rectifier 41 will place a positive potential on the gate 40 and thus tend to trigger or fire the electronic switching device at the beginning of each pulsation from the rectifier 31 therethrough. The combined effect of the above is to energize the armature in pulses in accordance with the motor torque and speed settings.

In addition to the speed and torque adjustments as described above, provision is also made for cycling the motor operation so that it will alternately be reversed upon the occurrence of the preset torque as determined by the adjustment of the autotransformer 32, and then after a predetermined time interval connect the motor for forward operation, thus enabling utilization of the inertia of the moving parts in performing a large share of the work.

Referring further to FIG. 3, the cycling control includes a motor reversing relay 51 having an actuating coil 52 operatively associated with a plurality of movable contacts 53, 54 and 55. With the actuating coil deenergized, the movable contacts engage fixed contacts *56a*, *57a* and *58a*, respectively. However, when the coil 52 is energized, the movable contacts will be actuated so that contact 53 engages contact *57a*, while contacts 54 and 55 will be moved into engagement with contacts *57b* and *58b*, respectively. This relay has its actuating coil 52 shunted by a capacitor 59 which provides a delay in opening of the relay, while a delay in closing is obtained by a resistor 60 which is in series in one side of the coil circuit with a diode 61.

Associated with the reversing relay 51 is an interlocking or latching relay 62 having an actuating coil 63 operatively associated with movable contacts 64 and 65. When the coil 63 is de-energized, the contacts 64 and 65 engage with stationary contacts *66a* and *67a*, respectively. Upon being energized, this relay will be actuated so as to shift its movable contacts into engagement with stationary contacts *66b* and *67b*, respectively.

A torque sensing relay 68 has an actuating coil 69 operatively associated with a movable contact 70. When the actuating coil 69 is de-energized, the movable contact 70 is in open position with respect to a stationary contact 71, but upon energization engages the contact 71. The relay 68 has a time delay opening by virtue of a capacitor 72 connected across its actuating coil 69.

The cycling control further includes cycling relays 73 and 74. The first of these has an actuating coil 75 operatively associated with a movable contact 76 which is adapted upon de-energization of the actuating coil to engage with a stationary contact 77. The coil 75 is shunted by a capacitor 78 which provides a time delay opening characteristic for this relay. The other relay 74 has an actuating coil 79 operatively associated with a pair of movable contacts 80 and 81. When de-energized, the contacts 80 and 81 engage with stationary contacts *82a* and *83a*, respectively. However, upon energization of this relay, the movable contacts are shifted into engagement with contacts *82b* and *83b*.

The operation of the motor control system of the present invention will now be described with reference to its embodiment in the thread tapping device. Before proceeding with the tapping operation, the slide contact 33 of the autotransformer 32 will be adjusted to provide a torque which is slightly less than the breaking strength of the tap, and the potentiometer 45 is adjusted by means of slide contact 46 for the proper cutting speed for the particular material being worked.

Assuming now that the tapping device has been stopped between its limits of travel, and that the upper limit switch 17 is in open position, upon closure of the main line switch 24, conductors 84 and 85 constituting the two lines of the alternating current circuit 23 will be energized. This will immediately result in the energization of the two cycling relays 73 and 74. Relay 73 will be energized through the following circuit: from conductor 84, through conductor 86 to one side of a voltage dropping resistor 87, through a diode 88 to one side of the actuating coil 75, thence through conductor 89, contacts 67a, 65 of relay 62, and thence through conductor 90 to the other side 85 of the alternating current circuit. Relay 73, upon being energized, opens its contacts 76, 77.

Relay 74 is energized through the following circuit: from the conductor 86 to one side of coil 79, through contacts 65, 67a of relay 62, and thence through conductor 90 to line 85. Upon energization, relay 74 operates to open its contacts 80, 82a so as to disconnect the actuating coil of relay 51. In its de-energized position, the relay 51 has its contacts 56a, 53 and 57a, 54 closed so as to connect the armature 27 for a reversed direction of operation. Contacts 81, 83b of relay 74 are closed and operate to connect the positive side of the bridge rectifier 41 through contacts 58a, 55, thence through current limiting resistor 46' to the control or gate 40, thus placing positive potential thereon and triggering the electronic switching device 37 so as to energize and start the armature 27 of the motor in its reversed direction of operation. During this operation, the negative side of the bridge rectifier 41 is connected through conductor 47, contacts 64, 66a of relay 62, and thence through conductor 36 to the cathode 39 of the electronic switching device 37. As thus connected, the counter electromotive force of the armature 27 is rendered ineffectual with respect to its opposition to the potential of the rectifier 41. Thus, the operating speed of the motor armature will be at maximum and operate the retraction of the tap at high speed.

As soon as the tap reaches its upward limit of movement, it will operate to close switch 17. Closure of this switch will now energize the coil 63 of relay 62 through a circuit as follows: from conductor 85, through switch 17, switch 18, conductor 91 to one terminal of coil 63, from the other terminal of the actuating coil to conductor 92 and thence through conductor 86 back to the other side of the A.C. circuit conductor 84. The relay 62 will then operate to open its contacts 65, 67a to de-energize relays 73 and 74. Simultaneously, it will close its contacts 65, 67b and establish a latching or holding circuit to its actuating coil 63, thus enabling the switch 17 to be opened without tripping the relay 62. Energization of this relay also opens its contacts 64, 66a to disconnect the negative side of rectifier 41 with respect to the cathode 39, and closes its contacts 64, 66b to connect the negative side of the rectifier 41 with the negative side of rectifier 31, thus re-establishing the preset speed control.

Upon de-energization of relay 74, this relay will now close its contacts 80, 82a so as to energize the actuating coil 52, with slight time delay, through the following circuit: from conductor 84, conductor 86 to one terminal of coil 52, from the other terminal through diode 61, resistor 60, contacts 82a, 80 of relay 74, thence by conductor 90 to conductor 85. Relay 51 then operates to connect the armature 27 for operation in a forward direction. The capacitor 48 and potentiometer 49 are at this time connected across the motor armature, and reflect the load-torque characteristic of the motor. With the initial in rush of motor current, and changes of current under operating conditions, the capacitor 48 will be charged and discharged, and operate in conjunction with the potential from the rectifier 41 to trigger and interrupt the armature circuit in such a manner that the motor will be pulsed at spaced intervals.

Whenever the torque approaches the preset value, which is slightly less than the breaking torque for the tap, the capacitor 48 will discharge through the potentiometer 49 and provide a potential source for energizing the actuating coil 69 of relay 68 through a circuit as follows: from slide contact 50, conductor 93, diode 94, thence to one terminal of actuating coil 69, from the other terminal through contacts 76, 77 of relay 73, and thence by conductor 95 to the end of potentiometer 49 which is connected to conductor 36. The relay 68 is thus torque sensitive and will immediately energize to close its contacts 70, 71 whenever the potential across the potentiometer 49 of the preset value is obtained for a torque condition slightly below that for which the autotransformer 32 is set.

When relay 68 closes, it starts the automatic cycling control by energizing the cycling relays 73 and 74. Relay 74 being energized will operate to open the energizing circuit of relay 51, whereupon the current flow to armature 27 will be reversed and the armature will operate in a reversed direction of rotation. Since relay 73 is also energized at this time, it will open its contacts 76, 77 and interrupt the energizing circuit of the actuating coil of relay 68 so that the capacitor 72 thereof will not be subjected to the initial heavy current surge when the armature is reversed.

The energizing circuit of relay 68 being thus interrupted, the charge on capacitor 72 will be dissipated and the relay 68 will be de-energized after a time interval, the opening of its contacts 70, 71 interrupting the energizing circuit of relays 73 and 74. Relay 74 operates immediately to energize relay 51 and thus connect the armature 27 for a forward direction of rotation. Relay 73, however, has a time delay opening, due to the charge which has been stored in capacitor 78. The delayed closure of contacts 76, 77 of the relay 73 prevents the initial current surge, when the armature 27 is connected to operate in a forward direction, from entering the capacitor 72. After this time delay, however, the energizing circuit of relay 68 is again connected so that it may be actuated in accordance with the torque characteristics, and will automatically cycle as often as necessary to break or remove the cutting chip responsible for the increased torque condition. When the tap reaches its lower limit of advance, the limit switch 18 will be opened, and the locking or holding relay 62 de-energized and the control conditions established to reverse the direction of rotation of the armature 27 to back up the tap from the finished work at maximum speed, as previously explained.

As explained above, it will appear that the relay 51 will actuate its movable contacts 53 and 54 to reverse the direction of operation of the motor armature 27. In this connection, provision is made to eliminate arcing and burning of the reversing contacts due to induced armature current flow, when the contacts are opened. For such purpose, it will be noted that the movable contact 81 of relay 74 is alternately connectable with contacts 83a and 83b which cooperate respectively with contacts 58b and 58a to provide a circuit connection through movable contact 55 of relay 51 to the gate electrode 40 of the switching device 37. With this arrangement, the gate electrode circuit will always be interrupted, to prevent triggering of the device 37, each time the relay 74 operates either to energize or de-energize the relay 51. Therefore, when the armature current falls below the minimum holding current for device 37, this device cuts off current flow, so that the delayed opening of the contacts of relay 51 takes place during the time of no current flow. It is thus possible to use a light duty relay.

Since the cycling operation is dependent upon a load-torque characteristic, the amount of charge which is placed upon the capacitor 48 will increase the time interval during which the motor operates in reversed direction automatically as the torque requirements are increased. This may depend upon the condition of the tap, condition of the load imposed by the chip, the toughness of the material being worked, and the size of the tap.

When large taps are used the autotransformer 32 will be normally set for a higher torque. The capacitor 72 under such high torque setting will be charged to a higher value, upon reversal of the motor, by the large charging and discharging surges imposed upon the capacitor 48, thus giving additional time for the large tap to cycle in reversed direction of rotation.

Various modifications may suggest themselves to those skilled in the art without departing from the spirit of my invention, and hence, I do not wish to be restricted to the specific form shown or uses mentioned, except to the extent indicated in the appended claims.

I claim:

1. A control system for a direct current motor having an armature circuit and a separately excited field circuit, comprising: a D.C. pulsating potential source connected to the armature circuit of said motor; means for varying the potential of said source to adjustably control the torque of said motor; electronic gating means in the connection from the positive terminal of said source to said armature; and means for controlling said gating means so as to supply said armature, said gating means having a cathode electrode connected to one side of the armature, and a gate control electrode with spaced energizing pulses in accordance with an operating characteristic of said armature, said control means comprising a gate triggering circuit connected between said cathode electrode and said gate control electrode, and having said armature therein.

2. A control system for a direct current motor having an armature circuit and a separately excited field circuit, comprising: a first D.C. potential source connected to the armature circuit of said motor; means for varying the potential of said source to adjustably control the torque of said motor; electronic gating means in the connection from the positive terminal of said source to said armature including a control electrode; and a means for controlling said gating means so as to supply said armature with spaced energizing pulses, including a second D.C. potential source having its positive terminal connected to said control electrode and its negative terminal connected to the connection from the negative terminal of said first source to said armature, said second source being adjustable to control the speed of said motor.

3. A control system for a direct current motor having an armature circuit and a separately excited field circuit, comprising: a first D.C. pulsating potential source connected to the armature circuit of said motor; means for varying the potential of said source to adjustably control the torque of said motor; electronic gating means in the connection from the positive terminal of said source to said armature including a control electrode; a second D.C. pulsating potential source having its positive terminal connected to said control electrode and its negative terminal connected to the connection from the negative terminal of said first source to said armature, said second source being adjustable to control the speed of said motor; and means responsive to an operating characteristic of said armature coacting with said second potential source to supply said armature with spaced energizing pulses.

4. A control system for a direct current motor having an armature circuit and a separately excited field circuit, comprising: a first D.C. pulsating potential source connected to the armature circuit of said motor, said source being adjustable to preset the torque of said motor; electronic gating means in the connection from the positive terminal of said source to said armature including a control electrode; a second D.C. pulsating potential source having its positive terminal connected to said control electrode and its negative terminal conected to the connection from the negative terminal of said first source to said armature, said second source being adjustable to preset the speed of said motor at the preset torque; and means for controlling said electronic gating means, said control means including and being responsive to an R-C circuit connected directly across said armature, whereby said gating means operates to supply said armature with spaced energizing pulses.

5. A control system for a direct current motor having an armature circuit and a separately excited field circuit, comprising: a first D.C. pulsating potential source connected to the armature circuit of said motor, said source being adjustable to preset the torque of said motor; electronic gating means in the connection from the positive terminal of said source to said armature including a control electrode; a second D.C. pulsating potential source having an out-of-phase relationship with respect to said first potential source, and having its positive terminal connected to said control electrode and its negative terminal connected to the connection from the negative terminal of said first source to said armature, said second source being adjustable to preset the speed of said motor; and means responsive to an operating characteristic of said armature for controlling said gating means so as to supply said armature with spaced energizing pulses in accordance with said preset torque and preset speed.

6. A control system for a direct current motor, comprising: a first direct current pulsating electrical source having positive and negative circuit connections with the armature of said motor, and being adjustable to preset the motor torque; electronic switching means for controlling current flow to said armature including a pair of electrodes in the positive connection circuit of said source to said armature, and a control electrode for gating the current flow between said electrodes; and a second direct current pulsating electrical source having a positive potential connection with said control electrode, a negative potential connection with the negative circuit connection of said first potential source, and being adjustable to preset the motor speed, whereby said first and second sources coact through common electronic switching means to control current flow to said armature.

7. A control system for a direct current motor, comprising: a first direct current pulsating electrical source having positive and negative circuit connections with the armature of said motor, and being adjustable to control the motor torque; electronic switching means for controlling current flow to said armature including a pair of electrodes in the positive connection circuit of said source to said armature, and a control electrode for gating the current flow between said electrodes; and a second direct current pulsating electrical source having out-of-phase relationship with respect to said first electrical source, a positive potential connection with said control electrode, a negative potential connection with the negative circuit connection of said first potential source, and being adjustable to control the motor speed.

8. A control system for a direct current motor, comprising: a first direct current pulsating electrical source having positive and negative circuit connections with the armature of said motor, and being adjustable to control the motor torque; electronic switching means for controlling current flow to said armature including a pair of electrodes in the positive connection circuit of said source to said armature, and a control electrode for gating the current flow between said electrodes; a second direct current pulsating electrical source adjustable to control the motor speed, said source having a positive potential connection with said control electrode and connected in opposition to the counter-electromotive force of the armature during forward rotation thereof; means for reversing the direction of rotation of said armature at the termination of a predetermined period of operation of said motor; and means for rendering said armature counter-electromotive force ineffective with respect to said second source during said reversed direction of operation of said armature, whereby said armature operates at increased speed during its reversed rotation.

9. A control system for a direct current motor, comprising: a direct current pulsating electrical source having positive and negative circuit connections respectively with the armature of said motor; switching means in said positive connection selectively energizable to open circuit and close circuit positions of operation with respect to current flow to said armature; first means for energizing said switching means to its closed position in response to a characteristic of said armature under one condition of motor operation; and second means for energizing said switching means to its open circuit condition in response to said armature characteristic under a different condition of motor operation.

10. A control system for a direct current motor, comprising: a direct current pulsating electrical source having positive and negative circuit connections, respectively, with the armature of said motor; switching means in said positive connection selectively energizable to open circuit and closed circuit positions of operation with respect to current flow to said armature; first means for energizing said switching means to its closed circuit position in accordance with a speed characteristic of said armature; and circuit means for energizing said switching means to its open circuit condition in accordance wth a torque characteristic of said armature.

11. A control system for a direct current motor, comprising: a direct current electrical source having positive and negative circuit connections respectively connectable with the armature of said motor; and switching means for reversing said connection with respect to said armature, said switching means being responsive to a load-torque characteristic of said motor and operative to cycle the direction of motor operation in alternate forward and reverse directions.

12. A control system for a direct current motor, comprising: a direct current electrical source having positive and negative circuit connections respectively connectable with the armature of said motor; switching means selectively operable to connect said connections with said armature for forward and reversed directions of rotation; said cycling control means for actuating said switching means to connect said armature for operation in a reversed direction of rotation upon the occurrence of a predetermined high torque condition, and after a time interval actuate said switching means to connect said armature for operation in a forward direction of rotation.

13. A control system for a direct current motor, comprising: a direct current electrical source having positive and negative circuit connections respectively connectable with the armature of said motor; switching means selectively operable to connect said connections with said armature for forward and reversed directions of rotation; and cycling control means for actuating said switching means to alternately connect said armature for forward and reversed directions of rotation, including means energizable in response to the occurrence of a high torque motor operating condition, and thereafter de-energizable after the lapse of a time interval.

14. A control system for a direct current motor, comprising: a direct current electrical source having positive and negative circuit connections respectively connectable with the armature of said motor; switching means selectively operable to connect said connections with said armature for forward and reverse directions of rotation; and cycling control means for actuating said switching means to connect said armature for operation in a reversed direction of rotation upon the occurrence of a predetermined high torque condition; and R-C circuit means operable after a time interval to actuate said switching means to connect said armature for operation in a forward direction of rotation.

15. A control system for a direct current motor, comprising: a direct current electrical source having positive and negative circuit connections respectively connectable with the armature of said motor; switching means selectively operable to connect said connections with said armature for forward and reversed directions of rotation; and cycling control means for actuating said switching means to alternately connect said armature for forward and reversed directions of rotation, including means energizable in response to the occurrence of a high torque motor operating condition, and thereafter de-energizable after the lapse of a time interval, said time interval being proportional to the value of said torque.

16. A control system for a direct current motor, comprising: a direct current electrical source having positive and negative circuit connections respectively connectable with the armature of said motor; switching means selectively operable to connect said connections with said armature for forward and reversed directions of rotation; and cycling control means for actuating said switching means to alternately connect said armature for forward and reversed directions of rotation, including means energizable in response to the occurrence of a high torque motor operating condition, and thereafter de-energizable after the lapse of a time interval, said time interval being large in the case of a high torque condition and shorter in the case of a relatively lower torque condition.

References Cited by the Examiner

UNITED STATES PATENTS

| | | | |
|---|---|---|---|
| 2,288,295 | 6/1942 | Moyer et al. | 318—257 |
| 2,308,620 | 1/1943 | Lear | 318—283 |
| 2,329,127 | 9/1943 | Levy | 318—257 |
| 2,548,307 | 4/1951 | Hall | 318—490 |
| 2,548,709 | 4/1951 | Drexler | 318—283 |
| 2,593,450 | 4/1952 | Hester | 318—341 |
| 2,653,289 | 9/1953 | Kelling | 318—257 |
| 2,753,507 | 7/1956 | Dodington et al. | 318—341 |
| 2,929,010 | 3/1960 | Lancaster et al. | 318—490 |
| 2,975,349 | 3/1961 | Green | 318—331 |
| 2,977,523 | 3/1961 | Cockrell | 318—331 |

OTHER REFERENCES

Chute G.M. Electronic Motor and Welder Controls, pages 231 and 236, McGraw Hill, New York, 1951.

German Allowed Application 1,072,693 1/60 318-341.

ORIS L. RADER, *Primary Examiner.*

MILTON O. HIRSHFIELD, *Examiner.*